United States Patent Office 3,438,991
Patented Apr. 15, 1969

3,438,991
1-AROYLALKYL DERIVATIVES OF ARYLHYDROX-YPYRROLIDINES AND ARYLHYDROXY-PIPER-IDINES
Paul Adriaan Jan Janssen, Vosselaar, near Turnhout, Belgium, assignor to Research Laboratorium Dr. C. Janssen, N.V., a company under the laws of Belgium and doing business at Beerse, Belgium
No Drawing. Continuation-in-part of application Ser. No. 801,990, Mar. 26, 1959. This application Nov. 15, 1960, Ser. No. 69,282
Claims priority, application Great Britain, Nov. 18, 1959, 39,123/59
Int. Cl. C07d 29/20, 27/06; A61k 27/00
U.S. Cl. 260—294.7          13 Claims

ABSTRACT OF THE DISCLOSURE

The invention involves pharmacologically useful 1-aroylalkyl derivatives of arylhydroxypyrrolidines and arylhydroxypiperidines and pharmaceutically useful salts thereof. These compounds are potent depressants of the central nervous system and are also analgesics, antipyretics and spasmolytic agents.

---

The present invention is a continuation-in-part of Ser. No. 801,990 filed Mar. 26, 1959, now abandoned.

The present invention relates to a new group of 1-aroylalkyl derivatives of arylhydroxypyrrolidines and arylhydroxypiperidines of the general structural formula

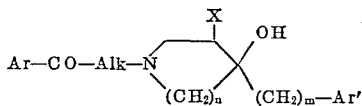

and the pharmaceutically useful salts thereof. In this formula Ar and Ar' are monocyclic aryl radicals, Alk is an alkylene radical of 2 to 4 carbon atoms, $n$ is 1 or 2, $m$ is 0, 1, or 2, and X is a hydrogen or a methyl radical. The radicals Ar and Ar' can represent halophenyls such as fluorophenyl, chlorophenyl, bromophenyl, and iodophenyl; alkoxyphenyls such as methoxyphenyl, ethoxyphenyl, dimethoxyphenyl, and trimethoxyphenyl; monocyclic aromatic hydrocarbon radicals such as phenyl, tolyl, xylyl, isopropylphenyl, and tertiary butyl phenyl; and a trifluoromethylphenyl radical.

The radical Alk represents a lower alkylene radical, preferably of 2 to 4 carbon atoms such as ethylene, trimethylene, propylene, butylene, methylpropylene, and tetramethylene. An especially preferred embodiment of this invention is represented by the compounds in which Alk is a trimethylene radical.

The integer $n$ can be 1 or 2. Obviously, where it is 1 a pyrrolidine ring is formed and where it is 2 the corresponding piperidine ring is formed. The integer $m$ can be 0, 1 or 2. Psychotropic potency is generally optimal, where $m$ is 0.

The organic bases of this invention form pharmaceutically acceptable salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesufonate, ethylene chlorohydrin, propylene chlorohydrin, allyl bromide, methallyl bromide and crotyl bromide.

The compounds of this invention can be prepared by the condensation of an aroylalkyl halide of the formula

with an appropriately selected compound of the formula

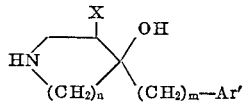

The reaction can be carried out in an inert solvent such as an aromatic hydrocarbon, e.g. benzene, toluene, xylene, a lower alkanol, e.g. ethanol, propanol, butanol, or a lower alkanone, e.g. acetone, butanone, or pentanone. In most cases the reaction can be usefully accelerated by elevated temperatures.

The aroylalkyl halides used as intermediates can be prepared conveniently by the Friedel-Crafts reaction including its milder variations employing, for example, γ-chlorobutyryl chloride in benzene or an appropriately substituted benzene such as toluene and xylene, a halogenated benzene such as chlorobenzene, bromobenzene, and fluorobenzene, or an alkoxy benzene such as anisole and phenetole.

These intermediates can also be prepared by treating an ω-haloalkanonitrile with an appropriate aroylmagnesium bromide followed by an acid hydrolysis of the adduct.

The 4-arylpiperidin-4-ol intermediate can be prepared by treating the appropriate 4-aryl-1,2,3,6-tetrahydropyridine with hydrogen bromide and then hydrolyzing the resulting 4-aryl-4-bromopiperidine to form the corresponding 4-arylpiperidin-4-ol.

The 3-arylpyrrolidin-3-ol intermediate and the 4-arylpiperidin-4-ol intermediate can alternatively be prepared by refluxing a 1-benzyl-4-piperidone or 1-benzyl-3-pyrrolidone with an appropriate aryl lithium compound under an atmosphere of nitrogen. The mixture is then decomposed with water to give the corresponding 1-benzyl-4-arylpiperidin-4-ol and 1-benzyl-3-arylpyrrolidin-3-ol. The compound is debenzylated by hydrogenation to give 4-arylpiperidin-4-ol and 3-arylpyrrolidin-3-ol.

The 4-aralkyl compounds of the formula

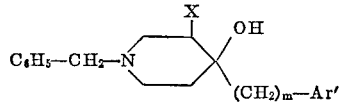

are conveniently prepared by refluxing the 1-benzyl-4-piperidone or 1-benzyl-4-pyrrolidone with the appropriate aralkylmagnesium halide under Grignard conditions.

The compounds of the foregoing structural formula in which X represents a methyl group can obviously occur in stereochemical arrangement in which the group X is in a position cis or trans to the hydroxy grouping. The nomenclature for these compounds has been simplified throughout this application by referring to the isomer in which the 3-methyl group is presumably cis relative to the hydroxy grouping as the "α form," while the "β form" presumably has the opposite or trans configuration. The presumption in regard to the assignment of stereochemistry rests on the usually reliable method of preferential solubility.

The compounds of this invention have useful pharmacological properties. They are potent depressants of the central nervous system and specifically psychotropic agents. They are also analgesics, anti-pyretics and spasmolytic agents.

The compounds which constitute this invention and the methods for preparation will appear more fully from a consideration of the following examples which are given for the purpose of illustration only and are not to be construed as limiting the invention in spirit or in scope. In these examples quantities are indicated in parts by weight. Temperatures are expressed in degrees centigrade (° C.), and pressures are expressed in millimeters of mercury (mm.).

Example 1

To a suspension of 341 parts of aluminum chloride in 1740 parts of carbon disulfide are added 96 parts of fluorobenzene with stirring and cooling. While the temperature is maintained at about 10° C., 141 parts of γ-chlorobutyryl chloride are added. After the addition is completed, the cooling bath is removed and the stirring is continued for 2 hours. The reaction mixture is poured into ice water. The organic layer is separated, washed with water, dried over anhydrous sodium sulfate, and filtered. The filtrate is concentrated under reduced pressure, and the residue is distilled to yield γ-chloro-p-fluorobutyrophenone boiling at about 136–142° C. at 6 mm. pressure.

By substitution of the appropriate starting materials in the procedure of the above paragraph and otherwise following the procedure outlined therein the following compounds are obtained:

β,4-dichloropropiophenone.
γ,4-dichlorobutyrophenone boiling at about 135–140° C. at 8 mm. pressure.
δ,4-dichlorovalerophenone boiling at about 185–190° C. at 12–14 mm. pressure.
β-Chloro-4-fluoropropiophenone.
β-Chloro-4-bromopropiophenone.
β-Chloro-4-methylpropiophenone.
γ-Chloro-4-methylbutyrophenone boiling at about 100–110° C. at 4 mm. pressure.
γ-Chloro-2,4-dimethylbutyrophenone boiling at about 130–143° C. at 1 mm. pressure.
β-Chloro-3,4-dimethoxypropiophenone.
γ-Chloro-4-isopropylbutyrophenone.
β-Chloro-4-tertiary-butylpropiophenone.
β-Chloro-4-methoxypropiophenone.
γ-Chloro-4-methoxybutyrophenone boiling at about 175° C. at 6 mm. pressure.
γ-Chloro-4-ethoxybutyrophenone melting at about 50.4–51.8 ° C.
γ-Chloro-2,5-dimethoxybutyrophenone boiling at about 150–190° C. at 11 mm. pressure.
β-Chloro-4-ethylpropiophenone.

Example 2

A Grignard reagent of m-fluorophenylmagnesium bromide is prepared by reacting 6.7 parts of magnesium with 94.5 parts of m-bromofluorobenzene in 80 parts of ether. Then 21 parts of γ-chlorobutyronitrile in 64 parts of ether are added and the mixture is refluxed under nitrogen for two hours with stirring. The mixture is then allowed to stand at room temperature for 15 hours and the excess Grignard reagent is decomposed by the addition of 56 parts of concentrated hydrochloric acid and 50 parts of water. The organic layer is separated, dried over anhydrous sodium sulfate, filtered and concentrated under reduced pressure. The residue is distilled to yield γ-chloro-m-fluorobutyrophenone boiling at about 105–125° C. at 2 mm. pressure.

By substituting the appropriate starting materials in the procedure of the above paragraph the following compounds are obtained:

γ-Chloro-3-methylbutyrophenone.
γ-Chloro-2-methylbutyrophenone.
γ,3-dichlorobutyrophenone.
β-Chloro-3-bromopropiophenone.
β-Chloro-3-methoxypropiophenone.
β-Chloro-3,4,5-trimethoxypropiophenone.
β-Chloro-3-methylpropiophenone.
β,2-dichloropropiophenone.

Example 3

A mixture of 856 parts of ammonium chloride and 3000 parts of 36% formaldehyde is stirred and heated to about 60° C. While cooling to maintain this temperature, 944 parts of α-methylstyrene are added slowly. After the addition is completed, the mixture is stirred at room temperature until the temperature of the mixture drops to about 40° C. After 2000 parts of methanol are added, the stirring is continued for 20 hours. The methanol is removed under vacuum and the residue is diluted with 2500 parts of concentrated hydrochloric acid. The mixture is heated for 4 hours with stirring at a temperature of 100° C. The mixture is then cooled, diluted with 2000 parts of water, made alkaline with sodium hydroxide, and extracted with benzene. The extract is dried, filtered and the filtrate is evaporated. The residue is distilled under vacuum to yield 4-phenyl-1,2,3,6-tetrahydropyridine which boils at about 97–112° C. at 1 mm. pressure. The hydrochloride of the compound is prepared by passing dry hydrogen chloride gas through a benzene solution of the base. The hydrochloride melts at about 199–202° C.

While the temperature is being maintained at about 10–20° C., anhydrous hydrogen bromide gas is passed for 7 hours through a solution of 160 parts of 4-phenyl-1,2,3,6-tetrahydropyridine in 500 parts of acetic acid. The mixture is stirred during the addition of the hydrogen bromide gas. After allowing the mixture to stand for 16 hours, the acetic acid and excess hydrogen bromide are removed under vacuum at a bath temperature of less than 40° C. The residue is suspended in ether. From this suspension the precipitate is collected on a filter. It is then recrystallized from a mixture of acetone and 2-propanol to yield 4-phenyl-4-bromopiperidine hydrobromide melting at about 209.5–210.5° C.

A solution of 160 parts of this hydrobromide in 3000 parts of water is treated with 100 parts of 20% sodium hydroxide. The resulting precipitate is recovered by filtration, washed with water, and then dissolved in 1500 parts of boiling toluene. The solution is dried and then chilled at 0° C. to yield 4-phenylpiperidin-4-ol melting at about 159–160° C.

An alternate procedure for the preparation of the 4-arylpiperidin-4-ols and 3-arylpyrrolidin-3-ols used as intermediates in the following examples is given in the following paragraphs.

While maintaining a temperature of −10° C., 75 parts of methyl methacrylate are added portionwise to a solution of 53.5 parts of benzylamine in 82 parts of methanol. The mixture is then allowed to stand for 3 days at room temperature and the solvent is evaporated. The residue is fractionated to yield methyl N-benzyl-α-methyl-β-aminopropionate boiling at about 120–121° C. at 0.5 mm. pressure. To a solution of 28 parts of this ester in 24 parts of methanol is added portionwise 18 parts of ethyl acrylate in 12 parts of methanol while a temperature of about 10° C. is maintained. The mixture is then allowed to stand for 5 days at room temperature and the solvent is evaporated. The residue is fractionated to yield methyl N - benzyl - N - (2 - carbethoxyethyl) - α - methyl - β-aminopropionate boiling at about 165–170° C. at 1 mm. pressure.

To a finely divided suspension of 4.8 parts of sodium in 280 parts of xylene are added 52 parts of this compound at a temperature of about 110° C. Vigorous stirring is maintained during the course of this addition. When the addition has been completed the mixture is refluxed until all the sodium is dissolved and then the mixture is cooled to below 10° C. and decomposed with water. To the mixture containing 1-benzyl-3-methyl-5-carbethoxy-4-piperidone there is added at about 15° C. dilute hydrochloric acid and the mixture is then refluxed overnight. After cooling, the xylene layer is separated and saved. The aqueous layer is cooled to 15° C., rendered alkaline with sodium hydroxide, and then extracted with a 2:1 mixture of benzene and ether. This extract is combined with the xylene solution saved above, filtered, dried, and then evaporated. The residue is distilled under vacuum to yield 1-benzyl-3-methyl-4-piperidone boiling at about 125–127° C. at 1 mm. pressure.

A solution of phenyl lithium, prepared from 6.3 parts of lithium, 70.7 parts of bromobenzene, and 120 parts of anhydrous ether is added portionwise to 54.8 parts of 1-benzyl-3-methyl-4-piperidone while a gentle reflux is maintained. After the addition is complete, refluxing is continued for about 2 hours. This reaction is carried out under a nitrogen atmosphere. The mixture is then decomposed by the addition of water and the layers are separated. The aqueous layer is extracted with ether and the combined organic layer and the ether extract are dried. Hydrogen chloride gas is passed through the solution and the precipitate which forms is collected on a filter and then dissolved in water. The aqueous solution is rendered alkaline to a pH of about 10 and the oil which forms is separated. The pH is then adjusted to about 13 and the solution is extracted with ether. The ethereal solution is dried and then hydrogen chloride gas is passed through the solution. The salt which precipitates is recrystallized from a 6:4:1 mixture of butanone, acetone, and 2-propanol by chilling at −20° C. to yield 1-benzyl-3α-methyl-4-phenylpiperidin-4-ol hydrochloride melting at about 180–183° C. A solution of 31.8 parts of this compound, 360 parts of 2-propanol, and 100 parts of distilled water is hydrogenated under atmospheric pressure and at a temperature of about 30° C. with 26 parts of a 5% palladium-on-charcoal catalyst. After the calculated amount of hydrogen is absorbed, the hydrogenation is stopped and the solution is filtered while hot. The catalyst is extracted with water and ethanol. This extract is combined with the filtrate saved from above, treated with diatomaceous earth, and evaporated to about 150 parts. Water is added and the mixture is then evaporated again to about 100 parts. The solution is diluted to a volume of about 1,000 parts, rendered alkaline, and saturated with sodium carbonate. After extraction with ether, the extract is dried over sodium carbonate, filtered, and partially evaporated. The solid which precipitates is collected on a filter and dried to yield 3α-methyl-4-phenylpiperidin-4-ol melting at about 135–136° C.

A further method for obtaining the 1-benzyl-3-methyl-4-arylpiperidin-4-ols from the reaction of phenyl lithium with 1-benzyl-3-methyl-4-piperidone is given in the following paragraph.

The phenyl lithium solution is prepared from 16.6 parts of lithium and 187.4 parts of bromobenzene in 320 parts of anhydrous ether. To this solution there is added in small portions over a period of 2 hours a solution of 122 parts 1-benzyl-3-methyl-4-piperidone in 160 parts anhydrous ether. The mixture is then stirred and refluxed for 15 hours. After cooling the reaction mixture in an ice-salt bath, it is decomposed by portionwise addition of 500 parts of water at a temperature of 0° C. The organic layer is separated, washed with 200 parts of water and dried. After the addition of dry ether to a total volume of 2000 parts, hydrogen chloride gas is introduced into the solution. The sticky hydrochloride is filtered off and boiled in a mixture of 400 parts 4-methyl-2-pentone and 200 parts acetone. An oil is formed which solidifies on scratching. Then another 200 part portion of acetone is added and the whole is boiled for 1 hour. The mixture is filtered while hot. The precipitate is recrystallized from a 6:4:1 mixture of butanone, acetone, and 2-propanol by chilling at −20° C. to yield 1-benzyl-3α-methyl-4-phenylpiperidin-4-ol hydrochloride melting at about 180–183° C.

The filtrate is kept overnight at room temperature and then filtered. The sticky precipitate is boiled in a mixture of 520 parts acetone and 80 parts ethanol. After cooling for 3 days at 0° C., 4.4 parts of 1-benzyl-3β-methyl-4-phenylpiperidin-4-ol hydrochloride melting at about 223.4–224.5° C. is filtered off. The filtrate is kept at −20° C. for two weeks to yield a second fraction of 0.8 part of the above compound. On further cooling of the mother liquor at −20° C. for 5 days, a third fraction of 0.7 part of the above compound is obtained. Repeated recrystallization of a sample of these crops from a mixture of 4-methyl-2-pentone and isopropanol ((2:1 by volume) gives pure 1-benzyl-3β-methyl-4-phenylpiperidin-4-ol hydrochloride melting at about 232.5° C.

Debenzylation as above yields 3β-methyl-4-phenylpiperidin-4-ol melting at about 150–150.6° C. The hydrochlorine melts at about 237–237.8° C.

By substituting the appropriate starting materials in the above procedures the following compounds are obtained:

4-(3-chlorophenyl)piperidin-4-ol melting at about 102.8–103.8° C.
4-phenylpiperidin-4-ol.
4-(4-tolyl)piperidin-4-ol.
4-(4-fluorophenyl)piperidin-4-ol.
4-(4-chlorophenyl)piperidin-4-ol.
3-phenylpyrrolidin-3-ol.
4-(2,3-dimethoxyphenyl)piperidin-4-ol melting at about 126.5–127.4° C.
4-(4-anisyl)piperidin-4-ol melting at about 131–132° C.
4-(2,6-dimethoxyphenyl)piperidin-4-ol hydrochloride melting at about 159.5–165.5° C.
4-(2-anisyl)piperidin-4-ol hydrochloride melting at about 226.5–227.2° C.
4-(3-tolyl)piperidin-4-ol hydrochloride melting at about 164–175° C.
3-methyl-4-(3-trifluoromethylphenyl)piperidin-4-ol melting at about 122.5–123.2° C.
4-(3-trifluoromethylphenyl)piperidin-4-ol hydrochloride melting at about 168.5–169.5° C.
4-(3-ethylphenyl)piperidin-4-ol hydrochloride melting at about 175–176° C.
4-(3-fluorophenyl)piperidin-4-ol melting at about 119.8–120.4° C.
4-(2-tolyl)piperidin-4-ol hydrochloride melting at about 258° C.
4-(2,5-dimethoxyphenyl)piperidin-4-ol hydrochloride melting at about 215–216° C.
3-(4-tolyl)pyrrolidin-3-ol melting at about 102–105° C.
3-(3-trifluoromethylphenyl)pyrrolidin-3-ol hydrochloride melting at about 153–154° C.
3α-methyl-4-phenylpyrrolidin-4-ol hydrochloride melting at about 112–113° C.

Example 4

In a closed reaction vessel a mixture of 8.7 parts of γ-chlorobutyrophenone, 14.2 parts of 4-phenyl-piperidin-4-ol, and 0.1 part of potassium iodide in 150 parts of toluene is heated at a temperature of 100–110° C. The contents of the flask are cooled and then filtered. The solid residue is treated with a mixture of water and ether. The ether layer is separated and then added to the filtrate from the original reaction mixture. The combined toluene and ether solution is dried over anhydrous potassium carbonate, filtered, and concentrated to about ¼ of its volume. The solution is cooled. The resulting precipitate is collected on a filter and recrystallized from diisopropyl ether to yield 1-(γ-benzoylpropyl)-4-phenylpiperidin-4-ol melting at 129–130° C.

The hydrochloride is prepared by treating the above described toluene-ether solution, after drying, with anhydrous hydrogen chloride gas. The precipitated salt is collected on a filter and recrystallized from 2-propanol. In this manner there is obtained 1-(γ-benzoylpropyl)-4- phenylpiperidin-4-ol hydrochloride melting at about 182–184° C. The structural formula is

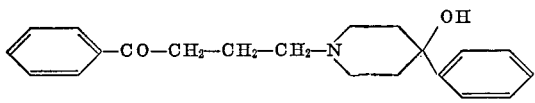

Example 5

By substituting the appropriate starting materials in the procedure of Example 4 the following compounds are obtained:

1-(β-benzoylethyl)-4-phenylpiperidin-4-ol melting at about 134–135° C. The hydrochloride of this compound melts at about 184–185° C.

1-(δ-benzoylbutyl)-4-phenylpiperidin-4-ol melting at about 73–75.2° C.

1-(γ-benzoylpropyl)-4-(4-tolyl)piperidin-4-ol melting at about 101–102.5° C. The hydrochloride of this compound melts at about 179.6–181.5° C.

1-(γ - benzoylpropyl)-4-(4-fluorophenyl)piperidin-4-ol melting at about 117.4–118.6° C. The hydrochloride of this compound melts at about 188–190.5° C.

1-(γ - benzoylpropyl)-4-(4-chlorophenyl)piperidin-4-ol melting at about 126.6–127.4° C.

1-[γ-(2-methylbenzoyl)propyl] - 4 - phenylpiperidin-4-ol hydrochloride melting at about 190–192° C.

1 - [γ-(2,4-dimethylbenzoyl)propyl]-4-phenylpiperidin-4-ol hydrochloride melting at about 183–185° C.

1 - [β-(4-methylbenzoyl)ethyl]-4-phenylpiperidin-4-ol hydrochloride melting at about 190–192.2° C.

1 - [β-(3-methylbenzoyl)ethyl]-4-phenylpiperidin-4-ol melting at about 133–134.8° C.

1-[β-(4-ethylbenzoyl)ethyl]-4-phenylpiperidin-4-ol hydrochloride melting at about 186.8–188.2° C.

1-[β-(4-tertiary butylbenzoyl)ethyl] - 4 - piperidin-4-ol hydrochloride melting at about 206–208° C.

1-[γ-(3-methylbenzoyl)propyl] - 4 - phenylpiperidin-4-ol hydrochloride melting at about 180–181.5° C.

1-[γ-(4 - methylbenzoyl)propyl] - 4 - phenylpiperidin-4-ol melting at about 122–123° C.

1-[γ-(4 - methylbenzoyl)propyl]-4-(4-tolyl)-piperidin-4-ol melting at about 116–117.4° C.

1-[γ-(2,4-dimethylbenzoyl)propyl] - 4-(4-iodophenyl)-piperidin-4-ol.

1-[γ-(4-methylbenzoyl)propyl] - 4 - (4-fluorophenyl)-piperidin-4-ol melting at about 129–130° C.

1-[γ-(4 - methylbenzoyl)propyl]-4-(4 - chlorophenyl)-piperidin-4-ol melting at about 141–142° C.

1-[β-(4-fluorobenzoyl)ethyl] - 4 - phenylpiperidin-4-ol melting at about 142–144° C. with decomposition. The hydrochloride of this compound melts at about 207.5–209.5° C.

1-[β-(4 - fluorobenzoyl)ethyl]-3α-methyl - 4 - phenyl-piperidin-4-ol melting at about 131.5–132.5° C. The hydrochloride of this compound melts at about 182.5–184.5° C.

1-[γ-(4 - fluorobenzoyl)propyl] - 4 - phenylpiperidin-4-ol melting at about 135.6–136.2° C. The hydrochloride of this compound melts at about 204.5–205.5° C.

1-[γ-(4-fluorobenzoyl)propyl] - 4 - (4-tolyl)-piperidin-4-ol melting at about 118–119.5° C. The hydrochloride of this compound melts at about 216–218° C.

1-[γ-(4-fluorobenzoyl)propyl] - 4 - (4-fluorophenyl)-piperidin-4-ol melting at about 120–121° C. The hydrochloride of this compound melts at about 201–203.5° C.

1-[γ-(4-fluorobenzoyl)propyl] - 4 - (4 - chlorophenyl)-piperidin-4-ol melting at about 148–149.4° C. The hydrochloride of this compound melts at about 226–227.5°. The oxalate of this compound melts at about 147–152.6° C. The hydrobromide of this compound melts at about 212–214° C. The methiodide of this compound melts at about 213–214.5° C. The sulfate of this compound melts at about 157–159.6° C.

1-[γ-(3 - fluorobenzoyl)propyl] - 4 - phenylpiperidin-4-ol melting at about 119.7–121° C.

1-[β-(4 - chlorobenzoyl)ethyl] - 4 - phenylpiperidin-4-ol hydrochloride melting at about 190–191.5° C.

1-[δ-(4-chlorobenzoyl)butyl] - 4 - phenylpiperidin-4-ol melting at about 106–106.8° C.

1-[γ-(4 - chlorobenzoyl)propyl]-4-phenylpiperidin-4-ol melting at about 130–131.4° C. The hydrochloride of this compound melts at about 229.5–230.5° C.

1-[γ-(4-chlorobenzoyl)propyl] - 4 - (4 - fluorophenyl)-piperidin-4-ol melting at about 135–136° C. The hydrochloride of this compound melts at about 202.4–204.4° C.

1-[γ-(4-chlorobenzoyl)propyl] - 4 - (4-chlorophenyl)-piperidin-4-ol melting at about 154–155° C. The hydrochloride of this compound melts at about 190.6–192.4° C.

1-[γ-(3 - chlorobenzoyl)propyl]-4-phenylpiperidin-4-ol hydrochloride melting at about 228.5–229.8° C.

1-[β-(2-chlorobenzoyl)ethyl] - 4 - phenylpiperidin-4-ol melting at about 96–98.6° C.

1-[β-(4-bromobenzoyl)ethyl] - 4 - phenylpiperidin-4-ol hydrochloride melting at about 187.6–188.6° C.

1-[β-(3-bromobenzoyl)ethyl] - 4 - phenylpiperidin-4-ol hydrochloride melting at about 163.6–165.2° C.

1-[β-(4 - methoxybenzoyl)ethyl] - 4 - phenylpiperidin-4-ol hydrochloride melting at about 207.5–209° C.

1 - [γ - (4 - methoxybenzoyl)propyl]-4-phenylpiperidin-4-ol hydrochloride melting at about 221–223° C.

1-[γ-(4-methoxybenzoyl)propyl] - 4 - (4 - tolyl)-piperidin-4-ol melting at about 128.6–129.8° C.

1-[γ-(4-methoxybenzoyl)propyl] - 4 - (4-fluorophenyl) piperidin-4-ol melting at about 130–131.2° C.

1-[γ-(4 - methoxybenzoyl)propyl]-4-(4-chlorophenyl) piperidin-4-ol melting at about 167–168.6° C.

1-[β-(3 - methoxybenzoyl)ethyl] - 4 - phenylpiperidin-4-ol melting at about 105–106.8° C.

1-[γ-(2,4-dimethoxybenzoyl)propyl] - 4 - phenylpiperidin-4-ol melting at about 109.5–110.5° C.

1-[β - (3,4,5 - trimethoxybenzoyl)ethyl]-4-phenylpiperidin-4-ol hydrochloride melting at about 210.5–212° C.

1-[γ-(4 - ethoxybenzoyl)propyl]-4-phenylpiperidin-4-ol melting at about 116–118° C.

1-[β-(3,4 - dimethoxybenzoyl)ethyl]-4-phenylpiperidin-4-ol hydrochloride melting at about 210.5–213° C.

Example 6

A mixture of 1.7 parts of γ-chlorobutyrophenone, 3.8 parts of 4-(2,4-dimethoxyphenyl)piperidin-4-ol, 0.1 part of potassium iodide and 100 parts of anhydrous toluene is heated in a sealed tube for 70 hours at about 130° C. After filtration the filtrate is partitioned between diisopropyl ether and water. The organic layer is dried and then hydrogen chloride gas is passed through the solution to yield a sticky precipitate. The solution is decanted and evaporated. The residue and the sticky precipitate are dissolved in acetone and allowed to stand two days. The solid precipitate is dissolved in a boiling 5:1 mixture of acetone and 2-propanol. After chilling this solution at —20° C. 1-(γ-benzoylpropyl) - 4 - (2,5-dmethoxyphenyl) piperidin-4-ol hydrochloride precipitates melting at about 218–218.6° C.

Example 7

By substituting the appropriate starting material in the procedure of the above example the following compounds are obtained:

1-[γ-(4-isopropylbenzoyl)propyl] - 4 - (chlorophenyl) piperidin-4-ol hydrochloride melting at about 231–232° C.

1-(γ - benzoylpropyl)-3β-methyl-4-phenylpiperidin-4-ol hydrochloride melting at about 252–253° C.

1-[γ-(4 - fluorobenzoyl)propyl] - 3α - methyl-4-phenyl-piperidin-4-ol hydrochloride melting at about 170.5–171.3° C.

1-[γ-(4-fluorobenzoyl)propyl] - 3β-methyl - 4-phenyl-piperidin-4-ol hydrochloride melting at about 246.3–246.5° C.

1-[γ-(4-fluorobenzoyl)propyl] - 4-(3 - ethylphenyl)-piperidin-4-ol hydrochloride melting at about 198–200° C.

1-[γ - (4-fluorobenzoyl)propyl] - 3-methyl-4 - (3-trifluoromethylphenyl)piperidin-4-ol hydrochloride melting at about 200.4–201.4° C.

1-[γ-(4-methoxybenzoyl)propyl] - 3α-methyl - 4-phenylpiperidin-4-ol hydrochloride melting at about 186–187.8° C.

1[γ-(4-methoxybenzoyl)propyl] - 3-methyl - 4-(3-trifluoromethylphenyl)piperidin-4-ol hydrochloride melting at about 215.5–217.5° C.

1-[γ-(4-methoxybenzoyl)propyl] - 4-(2,5-dimethoxyphenyl)piperidin-4-ol hydrochloride melting at about 212–212.6° C.

Example 8

A mixture of 2 parts of γ-chlorobutyrophenone, 5.2 parts of 3-methyl-4-(3-trifluoromethylphenyl)piperidin-4-ol, 0.1 part of potassium iodide, and 80 parts of toluene is heated in a sealed tube for 70 hours at about 140–150° C. The solution is decanted from the oil and then partitioned between diisopropyl ether and water. The organic layer is separated, dried, and hydrogen chloride gas is passed through the solution. The solid precipitate is collected on a filter and saved. The filtrate is evaporated. The residue and the precipitate are dissolved in boiling acetone. After removing the insoluble material, the solution is chilled at −20° C. to yield 1-(γ-benzoylpropyl)-3-methyl-4-(3-trifluoromethylphenyl)piperidin-4-ol hydrochloride melting at about 212–214° C.

Example 9

By substituting the appropriate starting material from the procedure of the above example the following compounds are obtained:

1-(γ - benzoylpropyl)-4 - (3 - trifluoromethylphenyl)-piperidin-4-ol hydrochloride melting at about 201.5–202.5° C.

1-[γ-(4-fluorobenzoyl)propyl] - 4-(2-tolyl) - piperidin-4-ol hydrochloride melting at about 213.5–216° C.

1-[γ-(4-fluorobenzoyl)propyl] - 4 - (2,3 - dimethoxyphenyl)piperidin-4-ol hydrochloride melting at about 227–229.5° C.

1-[γ-(4 - fluorobenzoyl)propyl] - 4-(2,5 - dimethoxyphenyl)piperidin-4-ol hydrochloride melting at about 247–247.5° C. with decomposition.

1-[γ-(4-methoxybenzoyl)propyl] - 4-(3-trifluoromethylphenyl)piperidin-4-ol hydrochloride melting at about 234–235° C.

1-[γ-(4-methoxybenzoyl)propyl] - 4-(2,3-dimethoxyphenyl)piperidin-4-ol hydrochloride melting at about 207.5–209° C.

Example 10

A mixture of 7 parts of γ-chloro-4-fluoro-butyrophenone, 6.3 parts of 4-(3-chlorophenyl)piperidin-4-ol, 9.5 parts of sodium carbonate, 0.1 part of potassium iodide, and 160 parts of 4-methyl-2-pentanone is refluxed for 72 hours and filtered while hot. The filtrate is diluted with anhydrous ether and hydrogen chloride gas is passed through the solution. The solid which precipitates is collected and then dissolved in a boiling 10:1 mixture of acetone and 2-propanol. The solution is then chilled at −20° C. to yield 1-[γ-(4-fluorobenzoyl)propyl] - 4-(3-chlorophenyl)piperidin-4-ol hydrochloride melting at about 184.5–186° C.

Example 11

By substituting the appropriate starting materials in the procedure of the above example the following compounds are obtained:

1-(γ-benzoylpropyl) - 4-(3 - fluorophenyl)piperidin-4-ol hydrochloride melting at about 173–175° C.

1-(γ-benzoylpropyl) - 4-(2-anisyl)piperidin-4-ol hydrochloride melting at about 210–211° C.

1-(γ-benzoylpropyl) - 4-(2,6-dimethoxyphenyl)piperidin-4-ol hydrochloride melting at about 188–190° C.

1-[γ-(4-fluorobenzoyl)propyl] - 4-(3-tolyl)piperidin-4-ol hydrochloride melting at about 211–212° C.

1-[γ-(4-fluorobenzoyl)propyl] - 4-(3-trifluoromethylphenyl)piperidin-4-ol hydrochloride melting at about 200.5–201.3° C. The base of this compound melts at about 85.5–86° C.

1-[γ-(4 - fluorobenzoyl)propyl] - 4-2-anisyl)piperidin-4-ol hydrochloride melting at about 227.5–228.2° C.

1-[γ-(4-methoxybenzoyl)propyl] - 4-(2-anisyl)piperidin-4-ol hydrochloride melting at about 225.5–226.5° C.

Example 12

A mixture of 5.5 parts of γ-chlorobutyrophenone, 5 parts of 3α-methyl-4-phenylpiperidin-4-ol, 7 parts of sodium carbonate and 120 parts of 4-methyl-2-pentanone is refluxed for 72 hours and filtered while hot. The filtrate is evaporated and the residue dissolved in anhydrous ether. Dry hydrogen chloride gas is passed through the solution. The solvent is evaporated and the residue is dissolved in hot acetone. To this solution is added 2-propanol and it is then evaporated. The residue is boiled in acetone, collected on a filter, and dried to yield 1-(γ-benzoylpropyl) - 3α-methyl-4-phenylpiperidin-4-ol hydrochloride melting at about 178–179.5° C.

Example 13

A mixture of 4.4 parts of γ-chloro-4-fluoro-butyrophenone, 4 parts of 4-(3-fluorophenyl)piperidin-4-ol, 6.4 parts of sodium carbonate, 0.1 parts of potassium iodide, and 120 parts of 4-methyl-2-pentanone is refluxed for 65 hours, cooled, and partitioned between water and ether. The organic layer is separated and then dried. Dry hydrogen chloride gas is passed through the solution. The oil which forms is separated and saved. The solution is evaporated and the residue and the oil are treated with acetone to yield a precipitate which is then recrystallized by chilling at −20° C. to yield 1-[γ-(4-fluorobenzoyl)propyl] - 4-(3-fluorophenyl)piperidin-4-ol hydrochloride melting at about 180–181.8° C.

By substituting γ-chlorobutyrophenone and 4-(3-ethylphenyl)piperidin-4-ol in the above paragraph, 1-(γ-benzoylpropyl)-4-(3-ethylphenyl)piperidin - 4 - ol hydrochloride melting at about 155.5–156.8° is obtained.

Example 14

A mixture of 8.8 parts of γ-chlorobutyrophenone, 6.7 parts of 4-(4-anisyl)piperidin-4-ol, 10.6 parts of sodium carbonate, 0.1 part of potassium iodide, and 200 parts of 4-methyl-2-pentanone is refluxed and stirred for 48 hours and then filtered while hot. The filtrate is evaporated. The residue is triturated with diisopropyl ether and then dissolved in a boiling 3:1 mixture of diisopropyl ether and ethanol. After chilling overnight at −20° C., 1-(γ-benzoylpropyl)-4-(4-anisyl)piperidin-4-ol melting at about 113–133.6° C. precipitates.

By substituting γ-chloro-4-fluorobutyrophenone in the procedure of the above paragraph, 1-[γ-(4-fluorobenzoyl)propyl]-4-(4-anisyl)piperidin-4-ol melting at about 123.2–124.4° C. is obtained.

Example 15

The free base of 4-(3-tolyl)piperidin-4-ol hydrochloride is liberated by dissolving 2.9 parts of the salt in water, alkalizing, extracting the solution with ether, and drying and evaporating the ether extract. The residue is then refluxed with 2.6 parts of γ-chlorobutyrophenone, 3.8 parts of sodium carbonate, 0.1 part of potassium iodide, and 40 parts of 4-methyl-2-pentanone for about 70 hours. The mixture is filtered while hot and the filtrate is evaporated. The residue is crystallized from diisopropyl ether by chilling at −20° C. to yield 1-(γ-benzoylpropyl)-4-(3-tolyl)piperidin-4-ol melting at about 105–106° C.

By substituting 4-(2-tolyl)piperidin-4-ol hydrochloride in the procedure of the above paragraph, 1-(γ-benzoylpropyl)-4-(2-tolyl)piperidin-4-ol melting at about 131–132° C. is obtained.

Example 16

A mixture of 6.8 parts of γ-chloro-4-tert-butylbutyrophenone, 10.5 parts of 4-(4-chlorophenyl)piperidin-4-ol, 0.1 parts of potassium iodide in 80 parts of toluene is heated in a sealed tube for 72 hours at about 120° C. and then filtered. The solid is washed with toluene to yield 1 - [γ - (4 - tert - butylbenzoyl)propyl] - 4 - (4 - chlorophenyl)piperidin-4-ol hydrochloride melting at about 259–261° C.

Example 17

A mixture of 7.34 parts of γ-chlorobutyrophenone, 6.5 parts of 3-phenylpyrrolidin-3-ol, 13 parts of sodium carbonate, 0.1 part of potassium iodide, and 240 parts of 4-methyl-2-pentanone is refluxed for 27 hours, cooled, and filtered. The filtrate is evaporated and the residue dissolved in ether. Hydrogen chloride gas is passed through the solution. The solid which precipitates is collected on a filter and recrystallized from 4:2:1 mixture of benzene, ether, and 2-propanol to yield 1-(γ-benzoylpropyl)-3-phenylpyrrolidin-3-ol hydrochloride melting at about 143–144.5° C. The oxalate is formed by dissolving the crude base in 2-propanol and adding to this solution a solution of oxalic acid and 2-propanol. The solid which precipitates is then collected and dried to give 1-(γ-benzoylpropyl)-3-phenylpyrrolidin-3-ol oxalate.

Example 18

By substituting equivalent quantities of the starting materials in the procedure of the preceding example and otherwise following the procedure outlined, the following compounds are obtained:

1 - (γ - benzoylpropyl) - 3α - methyl - 4 - phenylpyrrolidin-4-ol hydrochloride melting at about 122–124.2° C.

1-(γ-benzoylpropyl)-3-(4-tolyl)pyrrolidin-3 - ol hydrochloride melting at about 147.5–148.5° C.

1 - (γ - benzoylpropyl) - 3 - (3 - trifluoromethylphenyl)pyrrolidin-3-ol hydrochloride melting at about 152–155.2° C.

1 - [γ - (4 - fluorobenzoyl)propyl] - 3 - (3 - trifluoromethylphenyl)pyrrolidin-3-ol hydrochloride melting at about 120.2–122.3° C.

1 - [γ - (4 - fluorobenzoyl)propyl] - 3 - phenylpyrrolidin-3-ol oxalate melting at about 131–133.5° C.

1 - [γ - (4 - fluorobenzoyl)propyl] - 3α - methyl - 4 - phenylpyrrolidin-4-ol oxalate melting at about 116–118° C.

1 - [γ - (4 - methoxybenzoyl)propyl] - 3α - methyl - 4 - phenylpyrrolidin-4-ol oxalate melting at about 168–171° C.

1 - [γ - (4 - fluorobenzoyl)propyl] - 3 - (4 - tolyl)pyrrolidin-3-ol melting at about 85–86° C.

Example 19

A solution of 4-ethylbenzyl magnesium chloride is prepared from 15.8 parts magnesium, 105.8 parts 4-ethylbenzyl chloride in 640 parts anhydrous ether while a gentle reflux is maintained for 2 hours. The mixture is stirred for 1 hour at room temperature. Then a solution of 60.2 parts of 1-benzyl-4-piperidone in 200 parts anhydrous ether is added portionwise. After stirring overnight at room temperature, 300 parts of water is added and the mixture is acidified with diluted hydrochloric acid. The combined acid aqueous solution is alkalized with ammonium hydroxide and extracted with benzene-ether. The organic layer is dried, filtered and evaporated. The oil residue is distilled to give 1-benzyl-4-(4-ethylbenzyl)piperidin-4-ol boiling at about 193–198° C. at 0.05 mm. pressure.

By substituting the appropriate starting materials in the above procedure the following compounds are obtained:

1-benzyl-4-(3-methylbenzyl)piperidin-4-ol boiling at about 185–190° C. at 0.1 mm. pressure.

1-benzyl-4-(4-methylbenzyl)piperidin-4-ol melting at about 85.8–86.6° C.

1-benzyl-4-(2-phenylethyl)piperidin - 4 - ol boiling at about 180–184° C. at 0.1–0.2 mm. pressure.

1,4-dibenzylpiperidin-4-ol hydrochloride melting at about 210–215° C.

1-benzyl-4-(4-fluorobenzyl)piperidin - 4 - ol hydrochloride melting at about 209.5–214.5° C.

1,4-dibenzyl-3-methylpiperidin-4-ol hydrochloride melting at about 218–220° C.

Example 20

A mixture of 16 parts of 1-benzyl-4-(3-methylbenzyl)piperidin-4-ol, 216 parts of 2-propanol, 50 parts of distilled water, and 7 parts of concentrated hydrochloric acid is debenzylated under atmospheric pressure at 22–38° C., in the presence of 7 parts of a 10% palladium-on-charcoal catalyst. After the calculated amount of hydrogen is taken up, hydrogenation is stopped. The charcoal is filtered off and the filtrate is evaporated. The residue is dissolved in water. The aqueous layer is alkalized with sodium hydroxide and extracted with ether. The ethereal solution is dried over potassium carbonate and evaporated. The residue is recrystallized from 120 parts of petroleum ether, yielding 4-(3-methylbenzyl)piperidin-4-ol melting at about 99–101° C.

By substituting the appropriate starting materials in the above procedure the following compounds are obtained:

4-(2-phenylethyl)piperidin-4-ol melting at about 69–72° C.

4-benzylpiperidin-4-ol melting at about 95–101° C.

4-(4-ethylbenzyl)piperidin-4-ol melting at about 84.8–87° C.

4-(4-methoxybenzyl)piperidin-4-ol melting at about 102–103.5° C.

3-methyl-4-benzylpiperidin-4-ol melting at about 79–83.5° C.

4-(4-fluorobenzyl)piperidin-4-ol hydrochloride melting at about 214–217° C.

Example 21

A mixture of 6 parts of γ-chloro-4-fluorobutyrophenone, 6 parts of 4-(4-ethylbenzyl)piperidin-4-ol, 20 parts of sodium carbonate, and a few crystals of potassium iodide in 280 parts of methyl isobutyl ketone is refluxed for 63 hours. The reaction mixture is filtered and the filtrate is evaporated. The residue is dissolved in 120 parts of petroleum ether and kept at room temperature to yield 1-[γ-(4-fluorobenzoyl)propyl]-4-(4-ethylbenzyl)piperidin-4-ol melting at about 57.2–58.2° C.

The mother liquor is heated with 120 parts of ether and hydrogen chloride gas is introduced into it. The precipitated hydrochloride is filtered off and recrystallized at room temperature from a mixture of 12 parts of absolute ethanol and 56 parts of benzene to yield 1-[γ-(4-fluorobenzoyl)propyl] - 4 - (4-ethylbenzyl)piperidin-4-ol hydrochloride melting at about 185–186.8° C.

By substituting the appropriate starting materials in the above procedure the following compounds are obtained:

1-[γ-(4-fluorobenzoyl)propyl] - 4 - (4-methoxybenzyl)piperidin-4-ol hydrochloride melting at about 174.6–175.8° C.

1-[γ-(4-fluorobenzoyl)propyl] - 4 - (4-methylbenzyl)piperidin-4-ol melting at about 89–90.8° C.

1-[γ-(4-fluorobenzoyl)propyl] - 4 - benzylpiperidin-4-ol hydrochloride melting at about 164–166° C.

1-[γ-(4-fluorobenzoyl)propyl] - 3 - methyl-4-benzyl-piperidin-4-ol melting at about 104–105.8° C.

1-[γ-(4-fluorobenzoyl)propyl] - 4 - (3-methylbenzyl)piperidin-4-ol hydrochloride melting at about 138–140.5° C.

1-[γ-(4-fluorobenzoyl)propyl] - 4 - (4-fluorobenzyl)piperidin-4-ol hydrochloride melting at about 179–180° C.

1-[γ-(4-fluorobenzoyl)propyl] - 4 - (2 - phenylethyl)piperidin-4-ol melting at about 94.2–95.8° C. The hydrochloride of this compound melts at about 177–178° C.

What is claimed is:

1. Compound of the formula

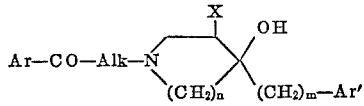

wherein Ar is a member of the class consisting of halophenyl, tolyl, methoxyphenyl, dimethoxyphenyl, trimethoxyphenyl, ethoxyphenyl, xylyl, and (lower) alkylphenyl; Ar' is a member of the class consisting of phenyl, halophenyl, methoxyphenyl, dimethoxyphenyl, trifluoromethylphenyl, and (lower) alkylphenyl; Alk is trimethylene; X is a member of the class of hydrogen and methyl; and $n$ is a positive integer smaller than three and $m$ is a number of the group consisting of 0, 1 and 2.

2. A compound of the formula

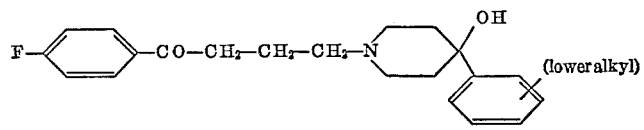

3. 1-[γ-(4-fluorobenzoyl)propyl] - 4 - (4-tolyl)piperidin-4-ol.

4. 1-[γ-(4-fluorobenzoyl)propyl] - 4 - (3-tolyl)piperidin-4-ol.

5. 1-[γ-(4-fluorobenzoyl)propyl] - 4 - (3-ethylphenyl)piperidin-4-ol.

6. A compound of the formula

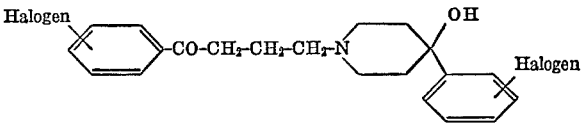

7. 1-[γ-(4 - fluorobenzoyl)propyl]-4-(4-chlorophenyl)piperidin-4-ol.

8. 1-[γ-(4 - fluorobenzoyl)propyl]-4-(4-fluorophenyl)piperidin-4-ol.

9. 1-[γ-(4 - fluorobenzoyl)propyl]-4-(3-trifluoromethylphenyl)piperidin-4-ol.

10. 1-[γ-(4-fluorobenzoyl)propyl] - 3 - methyl-4-(3-trifluoromethylphenyl)piperidin-4-ol.

11. 1-[γ-(4 - fluorobenzoyl)propyl]-3-phenylpyrrolidin-3-ol.

12. 1-[γ-(4-fluorobenzoyl)propyl] - 3 - (4-tolyl)pyrrolidin-3-ol.

13. A compound of the formula:

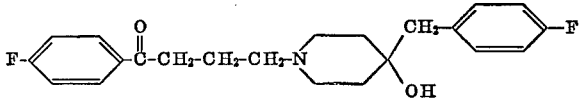

References Cited

UNITED STATES PATENTS

| | | | |
|---|---|---|---|
| 2,702,293 | 2/1955 | Hoffmann et al. | 260—294.7 |
| 2,880,211 | 3/1959 | Elpern | 260—294.7 |
| 2,904,550 | 9/1959 | Pohland | 260—294.3 |
| 2,973,363 | 2/1961 | Janssen | 260—294.7 |

FOREIGN PATENTS 632,437  12/1961  Canada.

OTHER REFERENCES

Richter's Organic Chemistry (Textbook), vol. 4, pp. 4, 5 and 23–26 (3rd Ed.). (1947), Elsevier Publishing Co., Inc., New York, N.Y.

Burger: Medicinal Chemistry, vol. 1, p. 47, Interscience Publishers, Inc., N.Y. (1951).

JOHN D. RANDOLPH, *Primary Examiner.*

U.S. Cl. X.R.

260—326.5, 592, 999

U.S. DEPARTMENT OF COMMERCE

PATENT OFFICE

Washington, D.C. 20231

UNITED STATES PATENT OFFICE
CERTIFICATE OF CORRECTION

Patent No. 3,438,991                                                         April 15, 19

Paul Adriaan Jan Janssen

It is certified that error appears in the above identified patent and that said Letters Patent are hereby corrected as shown below:

Column 8, line 66, before "chlorophenyl" insert -- 4- --. Column 10, line 13, "4-", second occurrence, should read -- 4-) --.

Signed and sealed this 24th day of March 1970.

(SEAL)
Attest:

Edward M. Fletcher, Jr.                              WILLIAM E. SCHUYLER, JR.

Attesting Officer                                                Commissioner of Patents